March 1, 1932. G. D. BRADSHAW ET AL 1,847,304
FLUID SEPARATOR
Filed Jan. 6, 1927 4 Sheets-Sheet 1
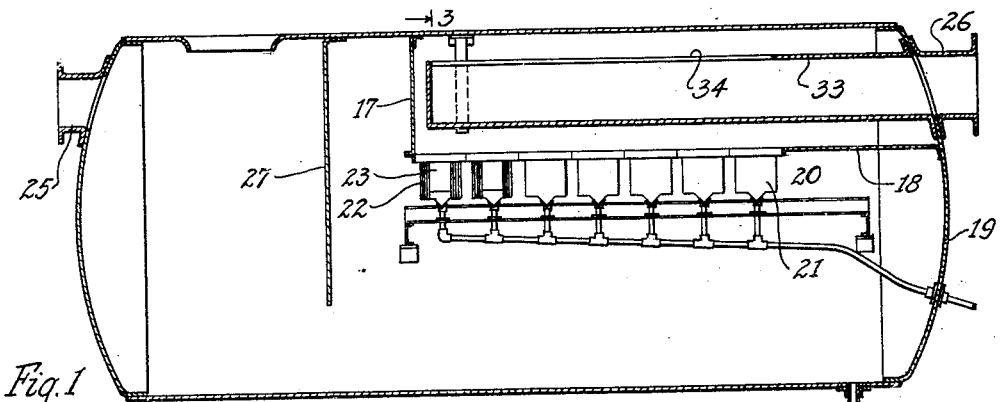
Fig.1
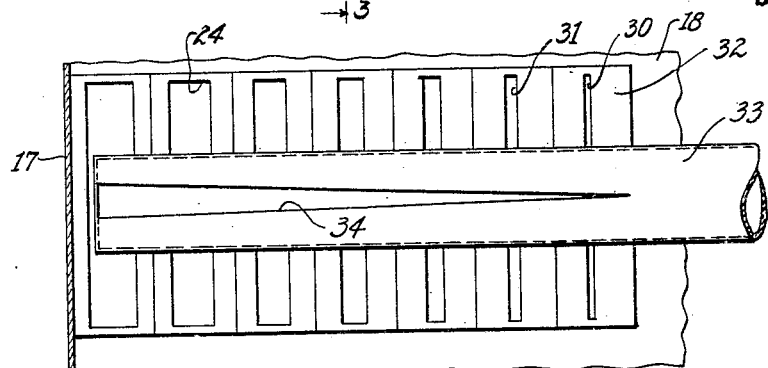
Fig.2
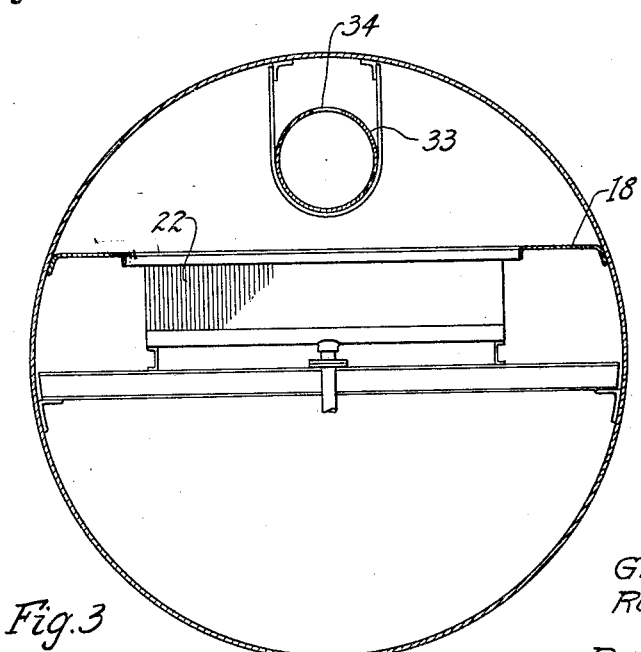
Fig.3
INVENTORS:
Grant D. Bradshaw
Roger W. Andrews
Atty.

INVENTORS:
Grant D. Bradshaw
Roger W. Andrews
By E. J. Andrews
Atty.

INVENTORS:
Grant D. Bradshaw
Roger W. Andrews
By E J Andrews
Atty.

March 1, 1932. G. D. BRADSHAW ET AL 1,847,304
FLUID SEPARATOR
Filed Jan. 6, 1927 4 Sheets-Sheet 4

INVENTORS:
Grant D. Bradshaw
Roger W. Andrews
By E. J. Andrews
Atty.

Patented Mar. 1, 1932

1,847,304

UNITED STATES PATENT OFFICE

GRANT D. BRADSHAW, OF BEAVER, AND ROGER W. ANDREWS, OF WILKINSBURG, PENNSYLVANIA, ASSIGNORS, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed January 6, 1927. Serial No. 159,297.

This invention relates to fluid separators or steam or gas purifiers or scrubbers, and has for its object providing a system of separators for purifying steam or other gases as the gas flows from one point to another of the generating or distributing system. It has for its object installing and arranging the separators and the accompanying equipment so as to uniformly distribute the flow of gas through the purifying baffles of the separators.

Figure 4:
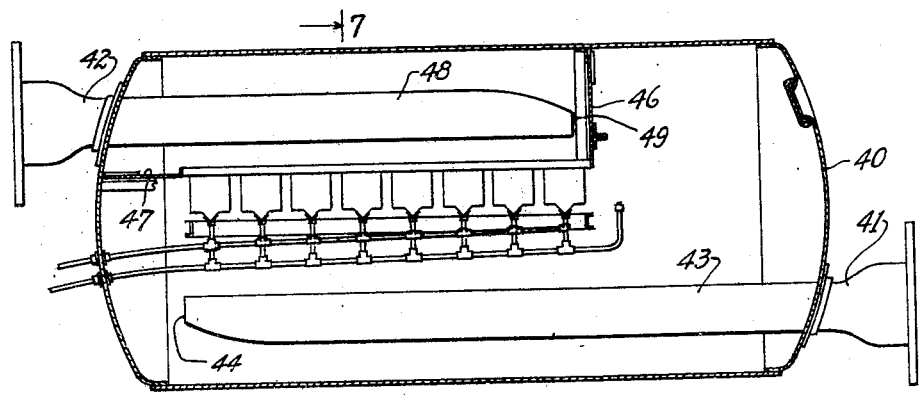
Figure 5:
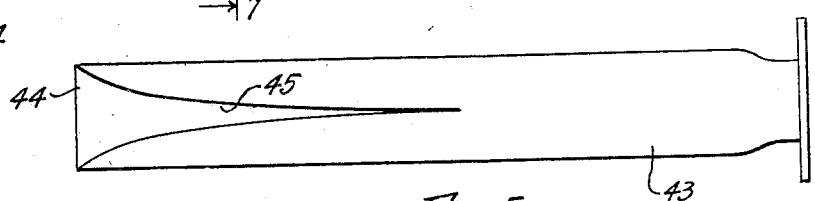
Figure 6:
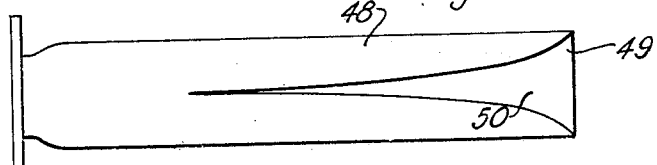
Figure 7:
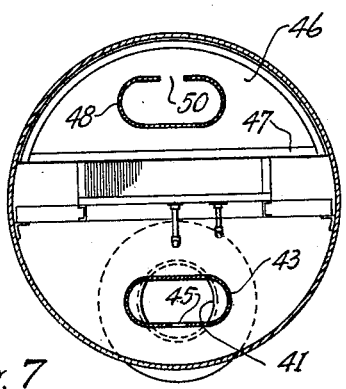
Figure 8:
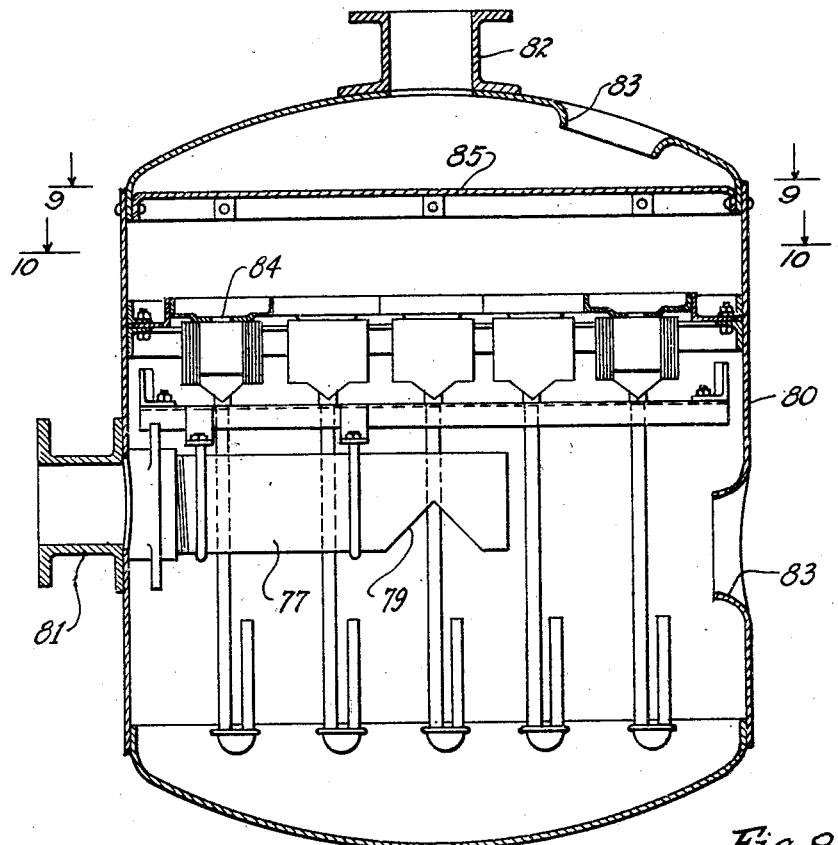
Figure 9:
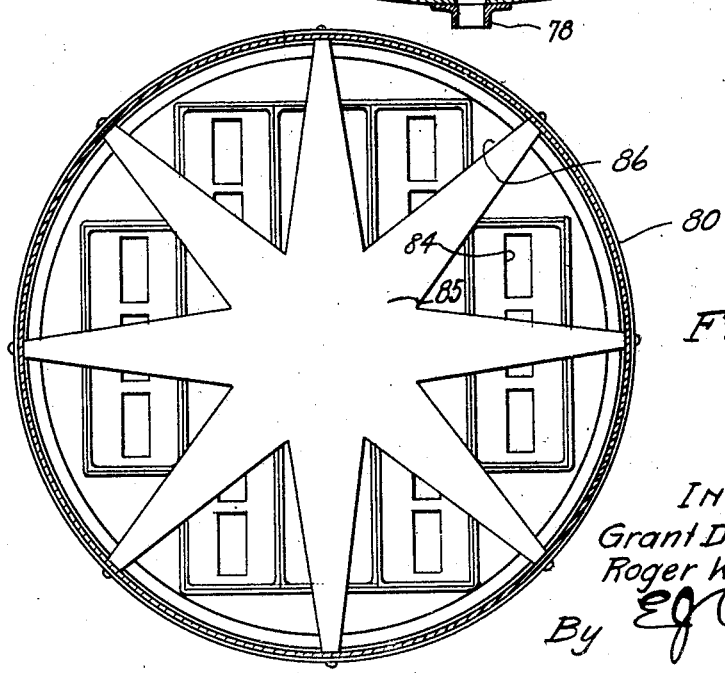
Figure 10:
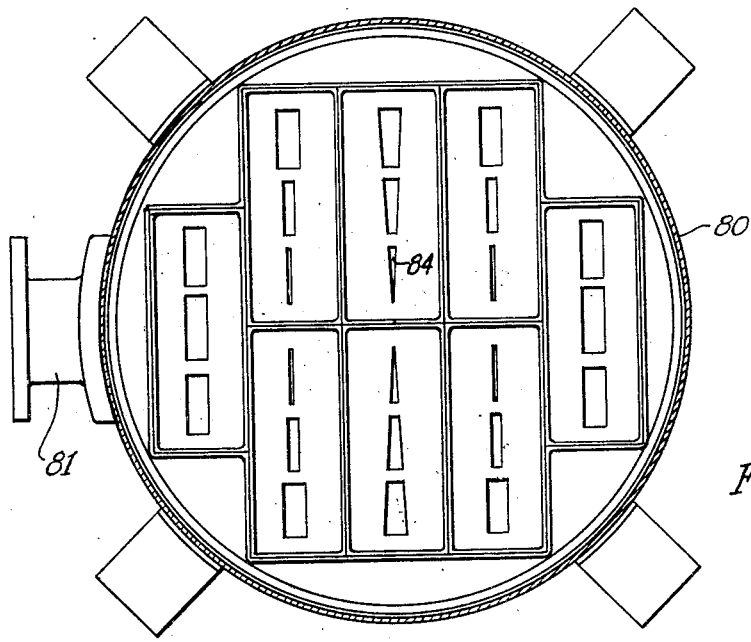

Of the drawings Fig. 1 is a vertical central sectional view of a separator system which embodies the features of our invention; and Fig. 2 is an enlarged plan view of the separators collector pipe; Fig. 3 is an enlarged sectional view of the system along the line 3—3 of Fig. 1. Fig. 4 is a central vertical sectional view of a modified system; Fig. 5 is a bottom view of a gas distributor pipe of the system; Fig. 6 is a plan view of the collector pipe of the system; Fig. 7 is a sectional view along the line 7—7 of Fig. 4; Fig. 8 is a vertical sectional view of another modification of the invention; Fig. 9 is a sectional view along the line 9—9 of Fig. 8; and Fig. 10 is a sectional view along the line 10—10 of Fig. 8. It is to be understood that these drawings are more or less diagrammatic, as the exact details of the apparatus are not essential to our invention.

The particular type of separator that we have used to illustrate our invention is what is known to the trade as the "Tracyfier," though it is to be understood that other types of separators are more or less applicable to our invention. The separators are installed in a casing 19. This type of separator 20 comprises a casing 21, in which are mounted a plurality of vertical baffles 22. The gas which is to be purified passes between the baffles 22 into a central chamber 23 and then upwardly and out of the separator through an opening 24 in the upper portion of the separator. In the use of the separators in carrying out our invention they are ordinarily installed in batteries in the casing 19 which is connected in the steam main or gas main of the system by means of an inlet 25 for the gas and an outlet 26. The gas passes into the casing through the inlet 25 and passes to the various separators, thence through the separators, as explained hereinabove, and out through the outlet 26, to the main of the system. Plates 17 and 18 prevent the gas from flowing from the inlet to the outlet without flowing through the separators.

In this instance we prefer to install a baffle 27 consisting of a plate extending across the upper portion of the casing 19, so that the gas is forced downwardly and along under the battery of separators. In this way the stream of gas from the inlet is more or less evenly distributed to the separators. But we have found that other means are desirable in order to uniformly distribute the flow through the various separators. For instance, there is a tendency for the gas to flow through the separators which are approximate to the outlet more freely than through the more remote ones. As the separators are positioned farther and farther from the outlet less and less gas flows through, unless special means are provided for uniform distribution. For this reason we provide a very narrow outlet 30 in the separator nearest to the outlet, and a somewhat wider outlet 31 for the next separator, and thus increase the width of the outlets as the separators are located more remote from the outlet. In this way the plates 32, surrounding the outlets of the separators, retard the flow of gas out from the separators more and more as the outlet 26 of the casing is approached.

However, if desired, the outlets of the separators may be made uniform, and to provide for uniform distribution of the gas through the baffles, we provide a collecting pipe 33 mounted over the separators and having a tapering inlet 34 on its upper side. This inlet having its widest end most remote from the outlet retards the flow of gas into the pipe more and more as the outlet is approached, and this provides uniform linear flow into the pipe and hence uniform distribution of the gas through the various baffles without reference to their particular location. If desired this uniform distribution of the gas through the separators may be attained by varying the width of the separator outlets, as described, above, or by the use of the collector pipe with tapering slot alone, or the two methods may be applied together.

In Fig. 4 we illustrate a somewhat modified system in which the casing 40 has an inlet 41 and an outlet 42, and, connected with the inlet, is a distributing pipe 43, which has an open end 44 and on its lower side is a tapering outlet 45. This outlet having its narrowest portion in the end of the pipe nearest the inlet 41 retards the flow of gas out of the pipe near the inlet and tends to transmit the gas uniformly to the separators. The outer end of the pipe is open and the slot increases in width very rapidly as this outer end is approached. The casing contains partitions 46 and 47. These partitions force all of the gas to pass through the separators before reaching the outlet 42. The outlets to these separators may be formed in any suitable manner.

We prefer, also, to use a collector pipe 48. This is also open at the end 49 and has a tapering inlet 50 with the widest end most remote from the outlet 42. This slot also increases in width more rapidly than the increase in distance from the narrow end of the slot and retards the flow of gas into the pipe towards the outlet 42 and tends to cause the gas to flow more freely through the separators most remote from the outlet, and thus to uniformly distribute the flow from the separators to the outlet 42. To improve the distribution, we insert the inlet 45 on the lower side of the pipe 43, and the outlet 50 on the upper side of the collector pipe 48; so that, in both cases, the gas has to flow around the pipe. In this instance, we prefer to use flattened distributing and collecting pipes, thus more conveniently fitting in the available spaces and also more perfectly distributing the gas as it flows out of and around the distributing pipe or around and into the collecting pipe. The amount of tapering of the slots 45 and 50 may be varied, to suit the needs, and one pipe only, or both, may be used.

Figs. 8, 9 and 10 illustrate a modified form of the invention comprising a casing 80 which is mounted vertically instead of horizontally. This casing has an inlet 81 and an outlet 82 with manholes 83, and a water outlet 78. A distributor pipe 77 is used which has an outlet 79 for the gas and the proper distribution of the gas through the separators may be partly obtained by means of a baffle 85 which is positioned above the separators and which has openings 86 therein. The shape of the openings and the position adjacent the periphery of the casing tends to pass more gas through the outer separators, and, if properly arranged, the distribution of the gas by means of the baffle 85 will be substantially uniform irrespective of the relative shape of the separator outlets 84. Hence, with the baffle 85 in use, the outlets of the separators may all be similar in shape and size.

Inasmuch as the gas passes out from the central upper portion of the casing through the outlet 82, it is desirable to retard the flow of gas very materially through the separators in the central portion of the casing. For this reason narrower outlets 84 may be provided in the central portion of the casing with the width of these outlets increasing as the periphery of the casing is approached; and some of the outlets may be made tapering, as indicated in Fig. 10. In such cases, the baffle 85 may be used or not, as desired. By the use of suitably varying outlets in the separators, the baffle 85 may be dispensed with.

We claim as our invention:

1. In a fluid separator system, a series of elongated fluid separators mounted side by side, a fluid outlet adjacent one side of said series, and means mounted outside of said separators for collecting fluid from each of said separators and directing it through said outlet, said means having a fluid inlet extending transversely over all of said separators.

2. In a fluid separator system, means as claimed in claim 1, in which said inlet decreases in cross section per unit of length as said outlet is approached.

3. In a fluid separator system, means as claimed in claim 1, in which said collecting means comprises a tubular member with said inlet on the upper side thereof.

4. A fluid separator comprising an elongated casing having a fluid inlet at one end and a fluid outlet remote from said end, a plurality of fluid purifiers mounted in said casing between said inlet and outlet, and a fluid collector pipe mounted in said casing outside of said purifiers and between said purifiers and said outlet, said pipe communicating with said outlet and having therein a fluid inlet, said collector pipe inlet comprising an elongated tapering slot on one side of said pipe.

5. A fluid separator system comprising an elongated casing having a fluid inlet at one end and a fluid outlet at the other end, a plurality of fluid purifier baffles mounted in said casing between said inlet and outlet, and a fluid collector pipe mounted in said casing between said baffles and said outlet, said pipe communicating with said outlet and having therein a fluid inlet, said collector pipe inlet comprising an elongated slot on one side of said pipe, said slot having edges converging towards said fluid outlet.

6. A fluid separator system comprising a casing having an inlet and an outlet, a plurality of fluid purifiers mounted in said casing between said inlet and said outlet, each of said purifiers having a fluid outlet, means for directing through said purifiers any fluids passing through said casing from said casing inlet to said casing outlet, said purifier outlets being of unlike sizes.

7. A separator system according to claim 6, wherein the said purifier outlets decrease in relative size as the casing outlet is approached.

8. A separator according to claim 6, in which a fluid collector pipe having an elongated inlet is mounted over said purifiers and communicates with said casing outlet.

9. A gas purifier system comprising a drum having an inlet and an outlet, a plurality of independent casings mounted in said drum in parallel in the path of motion of gas flowing from said inlet to said outlet, purifying baffles mounted in each casing, and means in said drum outside of said casings for retarding the flow of gas through some of said baffles more than through others.

10. A gas purifier system as claimed in claim 9, in which said means are located between said casings and said outlet.

11. A gas purifier system as claimed in claim 9, in which said means are located between said casings and said outlet, and are arranged to retard the flow of gas through the casings nearer the outlet more than through more remote casings.

12. A gas purifier system as claimed in claim 9, in which said means comprise a collector pipe mounted between said casings and said outlet and communicating with said outlet.

13. A gas purifier system comprising a drum having an inlet and an outlet, a plurality of purifying baffles mounted in said drum in parallel in the path of motion of gas flowing from said inlet to said outlet, and means in said drum for retarding the flow of gas through some of said baffles more than through others, said means comprising a distributor pipe mounted between said baffles and said inlet.

14. A gas purifier system as claimed in claim 9, in which said means are located between said casings and said inlet, and are arranged to retard the flow of gas through the casings nearer the inlet more than through more remote casings.

15. A gas purifier system comprising a drum having an inlet and an outlet, a plurality of purifying baffles mounted in said drum in parallel in the path of motion of gas flowing from said inlet to said outlet, and means in said drum for retarding the flow of gas through some of said baffles more than through others, said means comprising a partition mounted in said drum in the path of motion of the gas, and said partition having a plurality of elongated openings therethrough, the openings decreasing in size as the outlet is approached.

16. A gas purifier system comprising a drum having an inlet and an outlet, a plurality of purifying baffles mounted in said drum in parallel in the path of motion of gas flowing from said inlet to said outlet, and means in said drum for retarding the flow of gas through some of said baffles more than through others, said means comprising a partition mounted outside of said baffles in the path of motion of the gas, said partition having a plurality of elongated openings therethrough, the openings decreasing in size as the outlet is approached, with the ends of the openings near the outlet being narrower than the ends more remote from the outlet.

17. A gas purifier system comprising a drum having an inlet and an outlet, a plurality of purifying baffles mounted in said drum in parallel in the path of motion of gas flowing from said inlet to said outlet, and means in said drum for retarding the flow of gas through some of said baffles more than through others, said means comprising a partition over said baffles, said partition being closed in the central portion of said casing and having openings around the periphery thereof, and said casing having an outlet in the central portion thereof over said partition.

In testimony whereof we hereunto set our hands.

GRANT D. BRADSHAW.
ROGER W. ANDREWS.